United States Patent Office 2,865,862
Patented Dec. 23, 1958

2,865,862

MAGNESIUM ANTIMONATE PHOSPHOR

Richard W. Mooney, Towanda, Pa., assignor to Sylvania Electric Products Inc., Salem, Mass., a corporation of Massachusetts No Drawing. Application October 24, 1956
Serial No. 617,905

2 Claims. (Cl. 252—301.5)

This invention relates to magnesium lithium antimonate phosphors.

Such phosphors activated by either manganese or uranium, or both, have been previously known, as shown in U. S. patent application Serial No. 319,188, filed November 6, 1952, by Peter W. Ranby, now Patent No. 2,785,137 issued Mar. 12, 1957, but their fluorescent emission was in the green to red region of the spectrum.

I have now discovered that the emission can be shifted to the blue by replacing the manganese and uranium activators by tungsten or titanium.

In addition, I have found that the use of titanium as a secondary activator, with manganese or uranium as the other activator, will greatly increase the light emission over that obtained with activation by manganese or uranium alone.

The proportion by weight of magnesium, lithium and antimony, expressed as the oxides, in the phosphor, can be between 20% and 60% of magnesium oxide (MgO), between 5% and 35% of lithium oxide ($Li_2O$), and between 30% and 70% of antimony trioxide ($Sb_2O_3$).

I prefer, however, to use between 25 and 40% magnesium oxide, between 10 and 20% lithium oxide and between 45% and 60% antimony trioxide.

In the preparation of these phosphors, I prefer to use basic magnesium carbonate, lithium carbonate and antimony trioxide as the raw materials. However, substitutions of other raw materials will give substantially the same results, these substitutions being obvious to those skilled in the art. Thus, for example, magnesium oxide or magnesium hydroxide may be used in place of the basic magnesium carbonate and similarly lithium oxide or lithium hydroxide may be used in place of the lithium carbonate.

The concentration of the titanium or tungsten activators may vary over a considerable range from 0.0001 to 0.25 gram atoms of activator per 100 grams of combined oxides in the original mixture. Preferably however the best phosphors are obtained with titanium concentrations between 0.005 and 0.04 gram atoms per 100 grams of combined oxides and with tungsten concentrations between 0.001 and 0.02 gram atoms per 100 grams of combined oxides. I prefer, for convenience, to use titanium dioxide or hydrated tungsten trioxide but halides or sulphates may also be employed. The effect of titanium activator concentration for a specific matrix composition is shown by way of example in Table I.

TABLE I

*Effect of titanium concentration*

[Matrix composition: MgO, 35%; $Li_2O$, 15% and $Sb_2O_3$, 50% by weight]

| Gram Moles of $TiO_2$ | Relative Brightness for Final Firing Temp. of— | |
|---|---|---|
| | 2,050° F. | 2,200° F. |
| 0.0025 | 12 | 29 |
| 0.0075 | 23 | 29 |
| 0.020 | 38 | 46 |
| 0.025 | 45 | 53 |
| 0.035 | 43 | 38 |
| 0.050 | 42 | 34 |
| 0.075 | 41 | 18 |

The effect of tungsten activator concentration for a specific matrix composition is shown by way of example in Table II.

TABLE II

*Effect of tungsten concentration*

[Matrix composition: MgO, 35%; $Li_2O$, 15%; and $Sb_2O_3$, 50% by weight]

| Gram Moles of $WO_3H_2O$ | Relative Brightness for Final Firing Temp. of— | |
|---|---|---|
| | 2,050° F. | 2,200° F. |
| 0.0002 | 16 | 22 |
| 0.002 | 33 | 21 |
| 0.004 | 33 | 38 |
| 0.010 | 30 | 25 |
| 0.016 | 31 | 23 |
| 0.032 | 21 | 21 |

The optimum firing temperature depends upon the activator concentration as shown in Tables I and II and to some extent on the composition of the matrix. Compositions which are high in antimony trioxide or lithium oxide give harder products and therefore require lower firing temperatures. However, I have found that the range from 1800° to 2200° F. is satisfactory for most compositions.

While a single firing of the well mixed raw materials gives a useful phosphor, the output is generally increased by dry grinding the product, mixing well and firing a second time. It is not necessary to employ the same temperature for both firings and, in fact, I prefer to use a temperature of about 1800 to 2000° F. for the first firing and then to refire at a higher temperature.

If the magnesium lithium antimonate phosphor is doubly activated by titanium and manganese the red output of the manganese-only-activated phosphor is increased as shown by the data on Table III.

TABLE III

*Red response of Mn and (Mn+Ti)-activated antimonates*

| Firing Procedure | Relative Red Response to 3650A | | Percent Increase of Doubly Activated Phosphor |
|---|---|---|---|
| | Mn Activated | (Mn-Ti Activated) | |
| 1 hour at 1,925° F | 18 | 19 | 6 |
| 1 hour at 2,100° F | 27 | 36 | 33 |
| 1 hour at 2,200° F | 29 | 42 | 45 |

The Mn was present to the extent of about 0.1% by weight of the phosphor in the above table, and the titanium was present to the extent of about 2% on the same basis. The firing procedure is as previously described.

Titanium will also act as a secondary activator in the uranium-activated magnesium lithium antimonate phosphor resulting in a net increase in the emission in the green. For example a phosphor prepared with 1.0 gram of uranyl nitrate and 1.0 gram of titanium dioxide with 50 grams of combined oxides is approximately 19% brighter in the green than the same phosphor without $TiO_2$.

The uranium was present to the extent of about 2% by weight of the phosphor and the titanium to the extent of about 2% on the same basis. The firing procedure is as previously described.

Having shown the scope of my invention, I will now describe specific examples of the preparation of these phosphors.

*Ex. 1.*—A phosphor was prepared for which the matrix has the composition: MgO, 0.563 gram moles; $Li_2O$, 0.326 gram moles; $Sb_2O_3$, 0.111 gram moles and in which the titanium activator concentration is 0.0162 gram atoms per 1.0 gram moles of combined oxides. Raw materials as listed below were carefully weighed, using the highest purity materials commercially available.

Basic magnesium carbonate _____ 80.7 grams (assay 43.3% MgO)
Lithium carbonate __ 37.0 grams (assay 40.5% $Li_2O$)
Antimony trioxide __ 50.0 grams (assay 100% $Sb_2O_3$)
Titanium dioxide ___ 2.0 grams (assay 100% $TiO_2$)

These materials were dry mixed by tumbling and then transferred to fused silica crucibles and fired for 1 hour at 1950° F. The product was crushed after cooling, well mixed and after transfer to a silica crucible fired again for 1 hour at 2150° F.

*Ex. 2.*—The W-activated phosphor is prepared with the same matrix composition but with a tungsten activator concentration of 0.0026 gram atoms per 1.0 gram moles of combined oxides. Thus the raw materials as listed below were carefully weighed, using the highest purity materials commercially available.

Basic magnesium carbonate _____ 80.7 grams (assay 43.3% MgO)
Lithium carbonate __ 37.0 grams (assay 40.5 $Li_2O$)
Antimony trioxide __ 50.0 grams (assay 100% $Sb_2O_3$)
Tungstic acid _____ 1.0 gram (assay 91.9% $WO_3$)

These materials were dry mixed by tumbling and then transferred to fused silica crucibles and fired for 1 hour at 1950° F. The product was crushed after cooling, well mixed and after transfer to a silica crucible fired again for 1 hour at 2150° F.

What I claim is:

1. A phosphor comprising magnesium lithium antimonate activated by a substance selected from the group consisting of tungsten and titanium, the selected substance being present in an amount between about 0.0001 and about 0.25 gram-atoms per 100 grams of the magnesium, lithium and antimony expressed in terms of the oxides, the proportion by weight of magnesium, lithium and antimony, expressed as the oxides can be between 20% and 60% of MgO, between 5% and 35% of lithium oxide, and between 30% and 70% of antimony trioxide, by weight.

2. A phosphor comprising magnesium lithium antimonate activated by a substance selected from the group consisting of manganese and uranium, and activated also, per 100 grams of magnesium, lithium and antimony expressed in terms of the oxides, by between about 0.001 and 0.25 gram-atoms of titanium, the proportion by weight of magnesium, lithium and antimony expressed as the oxides can be between 20% and 60% of MgO, between 5% and 35% of lithium oxide, and between 30% and 70% of antimony trioxide, by weight.

References Cited in the file of this patent
UNITED STATES PATENTS
2,785,137     Ranby _____ Mar. 12, 1957

OTHER REFERENCES

Kroger: Some Aspects of the Luminescence of Solids (1948), pp. 158–161.